United States Patent [19]
Cropton

[11] 3,915,577
[45] Oct. 28, 1975

[54] DISPENSERS

[75] Inventor: Rupert James Cropton, Sunbury-on-Thames, England

[73] Assignee: Gavia A.G., Vaduz, Liechtenstein

[22] Filed: July 22, 1974

[21] Appl. No.: 490,312

[30] Foreign Application Priority Data
Mar. 6, 1974 United Kingdom............... 10071/74

[52] U.S. Cl................................ 401/186; 401/270
[51] Int. Cl.².......................................... A46B 11/02
[58] Field of Search........................... 401/183–186, 401/269, 270, 268, 132–135

[56] References Cited
UNITED STATES PATENTS
2,750,615 6/1956 Brazeman........................... 401/183
2,891,272 6/1959 Wenglor et al. .................... 401/269
2,994,897 8/1961 Snable ................................ 401/186
3,206,789 9/1965 Krauth ............................... 401/183
3,414,360 12/1968 Schwartzman...................... 401/134

Primary Examiner—Lawrence Charles
Attorney, Agent, or Firm—Richard L. Stevens

[57] ABSTRACT

The invention relates to dispensers for liquids, particularly dispensers for dispensing liquid to a brush held by the dispenser for cleaning dentures. A metering arrangement for the liquid is provided in which the liquid flows through channels in the outer surface of a metering plug, between the metering plug and the metering chamber and the metering chamber includes a recess at the upstream end of the channels so that any flash from moulding of the plug will not block the channels.

8 Claims, 3 Drawing Figures

U.S. Patent  Oct. 28, 1975  3,915,577
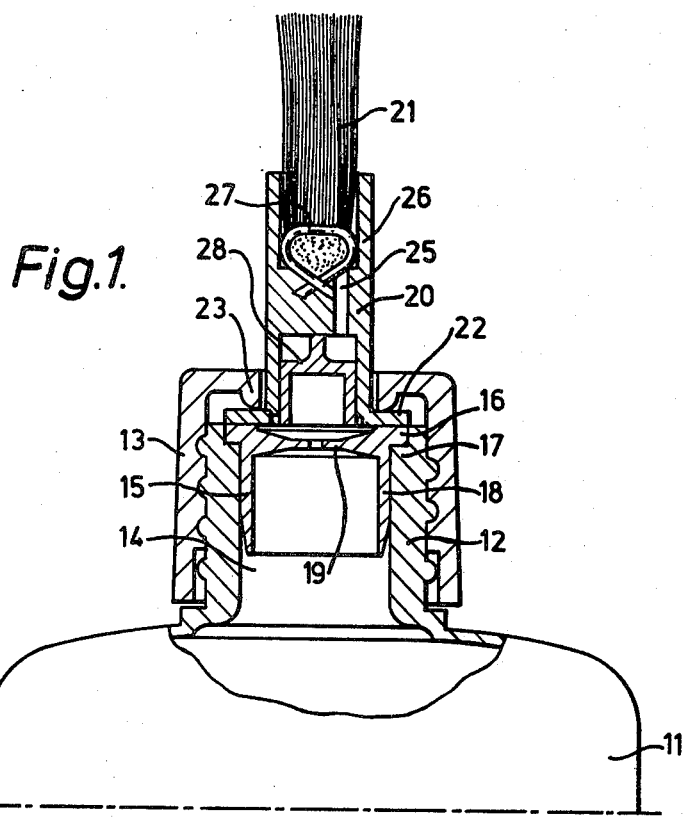
Fig.1.
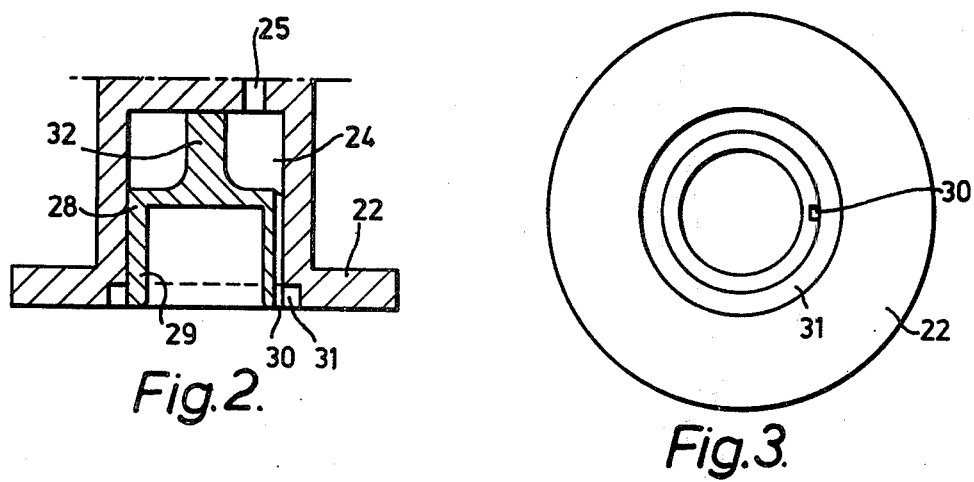
Fig.2.
Fig.3.

3,915,577

DISPENSERS

BACKGROUND OF THE INVENTION

The present invention relates to liquid dispensers.

It is known for liquid dispensers to include a metering arrangement in which a hole is provided between the interior of the liquid container and the point at which the liquid is to be dispensed, the hole being of a predetermined size to meter the liquid.

However, it has been found in practice that if the plug is to be made of a plastics material it is difficult to mould or provide the hole in the middle of the metering plug.

SUMMARY OF THE INVENTION

The present invention describes a metering plug in which the metering of the liquid is carried by means of one or more channels moulded in the side of the plug which in use, provide bores through which the liquid may pass.

It will be understood that the word "metering" has a broad meaning in the present application. Thus the word covers accurate metering of a liquid or alternatively, the restriction of passage of the liquid from the interior of the container so as to prevent too much liquid passing out of the container in normal use. In respect of the latter meaning, there will be described a dispenser which includes a metering device for preventing too much liquid from being passed out of the container by the user and this may be particularly useful in dispensing liquids from bottles of toiletries such as perfumes, shampoos and denture cleaners.

The present invention provides in or for a dispenser, a liquid metering arrangement comprising a housing including a metering chamber, a metering plug arranged generally across the chamber, an outer peripheral surface of the plug including at least one channel so that metered liquid can only pass through the or each channel between the outer peripheral wall of the plug and the wall of the metering chamber, the wall of the chamber including a recess situated adjacent the upstream end of the or each channel.

BRIEF DESCRIPTION OF THE DRAWINGS

FIG. 1 is a cross section of part of a dispenser according to the invention,

FIG. 2 is a vertical section of a detail of FIG. 1 and,

FIG. 3 is an under plan view of the part shown in FIG. 2.

DESCRIPTION OF THE PREFERRED EMBODIMENT

The dispenser of FIG. 1 comprises a bottle 11 of flexible plastics material having moulded thereto an outlet in the form of a screwed neck 12. The screw neck 12 carries a screwed cap 13 having a bore 14 coaxial with the screwed neck 12 passing therethrough. Situated within the screwed neck 12 is a plug 15 which has a flange 16 around its upper circumferential edge which sits on an annular shoulder 17 formed in the outer end of the screwed neck 12.

The upper surface of the flange 16, when seated on the annular shoulder 17 is flush with the outer end of the screwed neck 12. As can be seen from FIG. 1 the plug 15 includes a downwardly depending cylindrical portion 18 which seals with the screwed neck 12 and a transverse upper diaphragm 19 which, in use, is pierced by the user of the bottle to provide a fluid connection between the interior of the bottle 11 and the outside of the plug 15.

A brush holder 20 extends away from the plug 15 through the bore 14 to support a brush 21 at its outer end. The brush holder 20 is generally cylindrical having at its lower end an annular flange 22 of the same diameter as the annular shoulder 17 and resting thereon. An annular lip 23 downwardly depends from the edge of the bore 14 of the cap 13 to engage the upper surface of the flange 22 so that when the screwed cap 13 is screwed downwardly onto the neck, the lip 23 forces the annular flange 22 downwardly into sealing contact with the upper surface of the flange 16 and the flange 16 into sealing contact with the shoulder 17.

The brush holder 20 being generally cylindrical in shape includes a chamber 24 communicating with the lower end of the brush holder 20, a bore 25 passing upwardly from the chamber 24 to a socket 26 in the upper end of the brush holder 20 in which the brush 21 is mounted by means of a staple 27.

Mounted within the chamber 24 in a sealing fashion is a plug 28 of moulded plastics material. The plug 28 forms a metering plug and is illustrated in more detail in FIGS. 2 and 3. As can be seen, the plug 28 is of cap shape having a cylindrical wall 29 which is in generally sealing communication with the wall of the chamber 24. However, as can be clearly seen from FIGS. 2 and 3, the cylindrical wall 29 includes at least one, in this case one channel 30, which extends generally parallel to the axis of the cylinder from one side of the plug 28 to the other. The channel 30 in combination with the mating walls of the chamber 24 provides a metering bore.

It will be clearly noted from FIG. 2 that the end of the channel 30 remote from the chamber 24 is generally flush with the lower face of the brush holder 20. However, the lower face of the brush holder 20 where it abuts the side walls of the chamber 24 is counterbored to provide an annular cut-away portion 31. Furthermore, it will be noted that the side of the metering plug 28 within the chamber 24 includes a spigot 32 which abuts the opposite wall of the chamber 24 to space the plug 28 accurately from that wall. The spigot 32 is arranged to be of such a length as to accurately maintain the outer end of the channel 30 within the cut-away portion 31.

In use, the dispensing bottle is sold with the diaphragm 19 of the plug 15 complete thereby sealing the liquid contents of the bottle within the bottle, and it may be arranged that the brush holder 20 is not inserted under the screwed cap 13. This may be simpler when packing the bottle in a suitable container. In this case, of course, the screwed cap 13 is screwed down sufficiently for the lip 23 to contact the upper surface of the flange 16 of the plug 15 to retain this sealingly in contact with the shoulder 17.

In either case, in use, the user unscrews the cap 13 and pierces a hole in the diaphragm 19 of the plug 15. The cap 13 is then screwed back in place with the flange 22 of the brush holder 20 under the screwed cap 13 so that on screwing the cap 13 up tightly, the lip 23 contacts the upper surface of the flange 22 and causes this to sealingly engage the upper surface of the flange 16.

In order to clean a set of dentures, the bottle 11 is turned upside down and gently squeezed so that liquid passes from the interior of the bottle 11 through the hole in the diaphragm 19 to the underside of the plug 28. The liquid is then passed through the metering bore provided between the channel 30 and the adjacent wall of the chamber 24 into the chamber 24 and from there through the bore 25 to the base of the brush 21 where it passes down the brush 21 on to the dentures.

The provision of the metering bore provides only a limited flow of liquid from the interior of the bottle to the brush. In some applications it may be necessary for the metering bore to be accurately formed but in most instances, a wide degree of tolerance is suitable.

One of the reasons for the provision of the cut-away portion 31 is that in moulding the plug 28 in a plastics material, some flash will sometimes block up the outer end of the channel 30 thereby preventing any liquid from passing through the channel 30. The cut-away portion 31 by-passes this area in which flash may occur and so allows liquid to be fed to the channel 30 even if there is flash present. However, it will be understood that it is necessary that the outer end of the channel 30 is accurately spaced in relation to the cut-away portion 31 and this is achieved by providing the spigot 32 which abuts the inner wall of the chamber and causes the outer end of the channel 30 to be in communication with the cut-away portion 31. It is not possible to push the plug further in to the chamber and allow the flash at the outer end of the channel 30 to come into contact with the walls of the chamber and thereby block up the channel 30.

Furthermore, the provision of a metering bore by means of a channel in the upper surface of the plug 28 rather than by a bore through the plug is much simpler and allows for more accurate moulding.

We claim:

1. A liquid dispenser including a neck, the neck being closed by a piercible diaphragm, a brush holder being mounted between the neck and a cap, the cap engaged to the neck, the brush holder extending from the cap, the brush holder having a lower wall which includes an inner surface to define a metering chamber, said wall terminating at one end of the holder, a metering plug arranged generally across the metering chamber, the plug having an upstream end and a downstream end, the upstream end lying in the same plane as the one end of the holder, the outer peripheral surface of the plug including at least a first channel, the channel and the inner surface of the chamber defining a metering bore having an upstream end at the one end of the holder such that metered liquid can only pass through the first channel and the wall of the metering chamber, the wall of the chamber including a recess at the one end of the holder and in communication with and adjacent to the upstream end of the channel;

spigot means on the metering plug to space the metering plug in the metering chamber to ensure that the upstream end of the channel and the one end of the holder remain in the same plane and to define a reservoir in communication with the first channel, and a second channel in communication with the reservoir and the base of the brush holder.

2. In or for a dispenser as claimed in claim 1 in which the recess comprises an annular chamber.

3. In or for a dispenser as claimed in claim 1 in which the plug is of a plastics material.

4. In or for a dispenser as claimed in claim 1 in which the housing is of a plastics material.

5. In or for a dispenser as claimed in claim 1 in which the housing forms part of the nozzle of a bottle.

6. In or for a dispenser as claimed in claim 1 in which the nozzle includes a brush.

7. In or for a dispenser as claimed in claim 1 in which the metering plug includes spacer means to accurately space the plug so that the recess is situated adjacent the upstream end of the or each channel.

8. In or for a dispenser as claimed in claim 7 in which the spacer comprises a spigot extending to the opposite wall of the housing.

* * * * *

UNITED STATES PATENT AND TRADEMARK OFFICE
CERTIFICATE OF CORRECTION

PATENT NO. : 3,915,577
DATED : October 28, 1975
INVENTOR(S) : Rupert James Cropton It is certified that error appears in the above—identified patent and that said Letters Patent are hereby corrected as shown below:

Claim 1, Column 4, line 22 after "brush" insert the following

-- in the brush --.

Signed and Sealed this

Eighth Day of February 1977

[SEAL]

Attest:

RUTH C. MASON
*Attesting Officer*

C. MARSHALL DANN
*Commissioner of Patents and Trademarks*

Disclaimer 3,915,577.—*Rupert James Cropton*, Sunbury on Thames, England. DISPENSERS. Patent dated Oct. 28, 1975. Disclaimer filed Feb. 11, 1977, by the assignee, *Gavia, A.G.*

Hereby enters this disclaimer to claims 7 and 8 of said patent.

[*Official Gazette March 29, 1977.*]